(Model.) 4 Sheets—Sheet 1.
C. J. A. SJOBERG.
BUTTON HOLE SEWING MACHINE.
No. 299,027. Patented May 20, 1884.
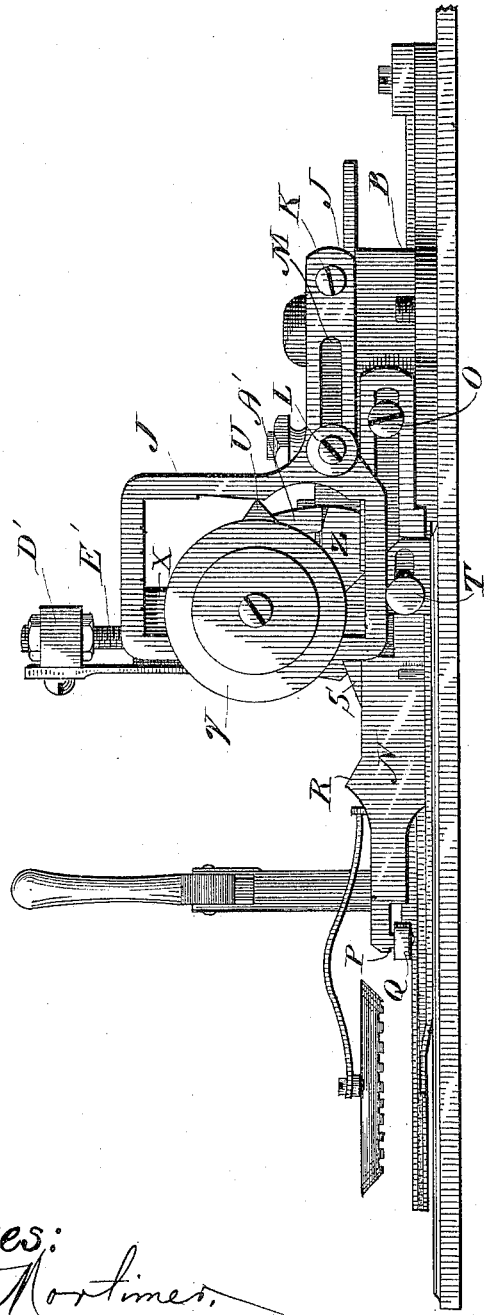
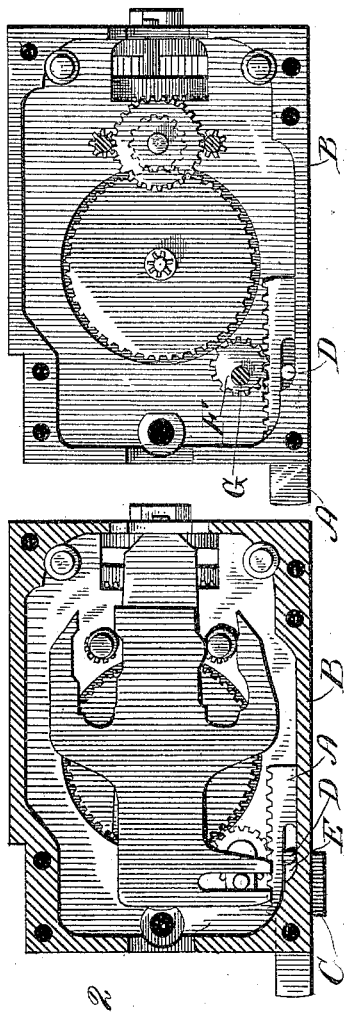
Witnesses:
N. N. Mortimer
S. S. Williamson
Inventor:
Carl J. A. Sjoberg
By Wooster Smith
Attys.

(Model.)
4 Sheets—Sheet 2.
C. J. A. SJOBERG.
BUTTON HOLE SEWING MACHINE.
No. 299,027. Patented May 20, 1884.
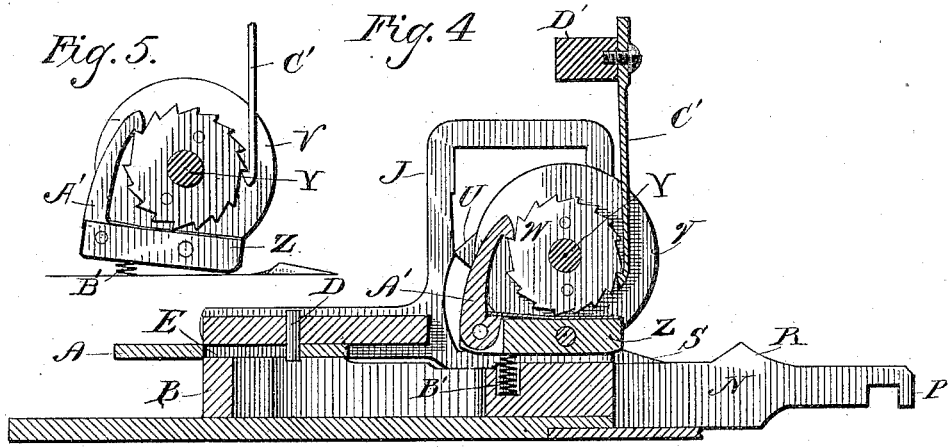
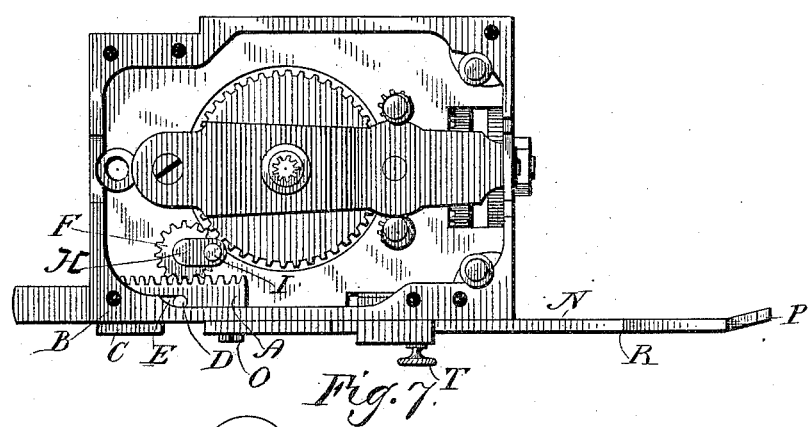
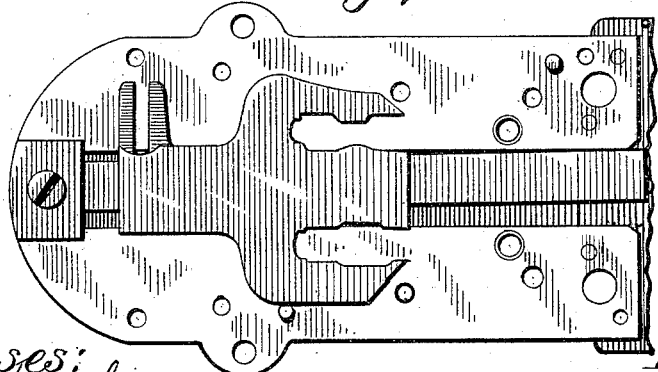
Witnesses:
W. W. Mortimer
S. S. Williamson
Inventor.
Carl J. A. Sjoberg
By Wooster & Smith
Attys.

(Model.)  
4 Sheets—Sheet 3.

C. J. A. SJOBERG.
BUTTON HOLE SEWING MACHINE.

No. 299,027. Patented May 20, 1884.

Witnesses:  
N. H. Mortimer  
S. S. Williamson

Inventor:  
Carl J. A. Sjoberg  
By Wooster & Smith  
Attys.

(Model.)  
4 Sheets—Sheet 4.

C. J. A. SJOBERG.
BUTTON HOLE SEWING MACHINE.

No. 299,027. Patented May 20, 1884.

Witnesses:
W. W. Mortimer
S. S. Williamson

Inventor:
Carl J. A. Sjoberg
By Wooster & Smith
Attys.

UNITED STATES PATENT OFFICE.

CARL J. A. SJOBERG, OF BRIDGEPORT, CONNECTICUT, ASSIGNOR TO THE SMITH & EGGE MANUFACTURING COMPANY, OF SAME PLACE.

BUTTON-HOLE SEWING-MACHINE.

SPECIFICATION forming part of Letters Patent No. 299,027, dated May 20, 1884.

Application filed June 22, 1883. (Model.)

*To all whom it may concern:*

Be it known that I, CARL J. A. SJOBERG, a citizen of the United States, residing at Bridgeport, in the county of Fairfield and State of Connecticut, have invented certain new and useful Improvements in Button-Hole Sewing-Machines; and I do hereby declare the following to be a full, clear, and exact description of the invention, such as will enable others skilled in the art to which it appertains to make and use the same.

My invention relates to certain novel and useful improvements in machines for stitching button-holes, but more especially to that class of such machines in which the stitching at the sides and barring at the ends of the button-hole is perfectly automatic, and has for its object to do away with the necessity of the manipulation by the operator of any part of the machine in order to reverse the feed or to effect the barring, and to thereby produce a machine in which the feeding and barring movements are automatic in every respect; and with these ends in view my invention consists in the details of construction and combination of elements hereinafter fully and in detail explained, and then specifically designated by the claims.

In order that those skilled in the art to which my invention appertains may understand more fully the construction and operation of the same, I will proceed to describe it in detail, referring by letter to the accompanying drawings, forming a part of this specification, in which—

Figure 8:
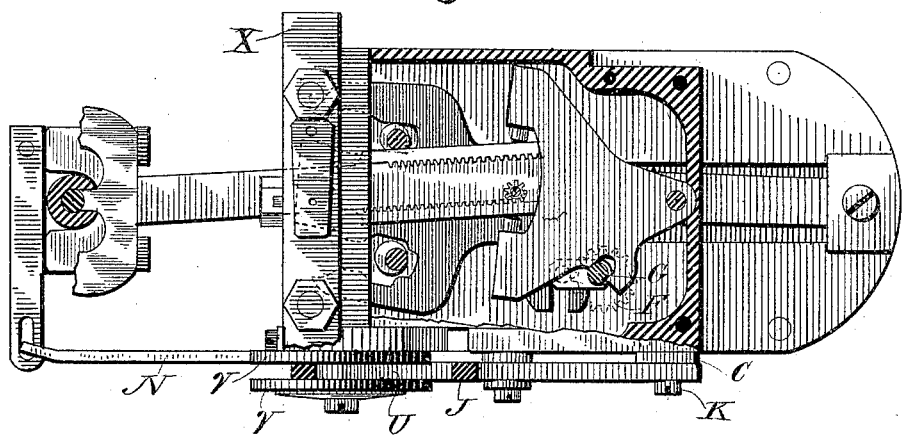
Figure 9:
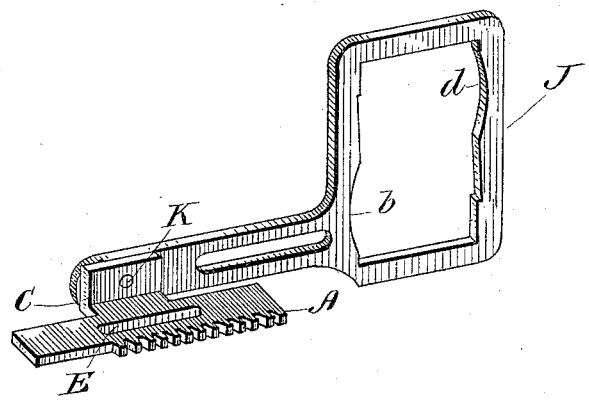
Figure 10:
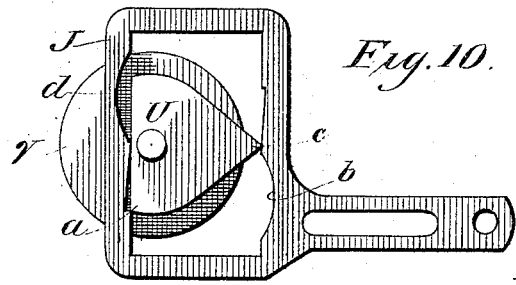
Figure 11:
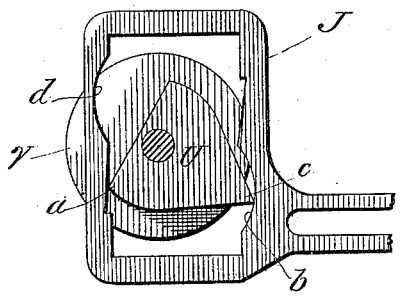

Figure 1 is a side elevation of my improved machine; Fig. 2, a bottom view with the casing sectioned, showing the shifting plate in operative position; Fig. 3, a bottom view showing the gearing of the several parts; Fig. 4, a vertical sectional view taken back of the frame; Fig. 5, a detail view of the mechanism for operating the revolving cam; Fig. 6, a bottom view similar to Fig. 2, but with the shifting plate removed; Fig. 7, a plan view illustrating the relative position of the shifting plate and oscillator; Fig. 8, a top view with the casing sectioned; Fig. 9, a detail perspective of the rack-bar and frame, and Figs. 10, 11, 12, and 13 detail side elevations showing the relative positions of the wiper-wheel and frame during the stitching of a button-hole.

Similar letters denote like parts in the several figures of the drawings.

It is not thought necessary to enter into a detailed description of any portion of the machine except that which immediately effects the reversing of the feed and the "barring," as in all other respects the device is substantially the same as is shown and described in patents granted to Saml. J. Baird, No. 206,768, dated August 6, 1878, and No. 159,740, dated February 16, 1875, also patent to Saml. Rockwell, No. 211,932, dated February 4, 1879. In the first-mentioned patent the feed is reversed, and the barring or "locking" at the ends of the button-hole accomplished by a "bent controlling-lever" connected to a lug on a crank-arm of a short shaft secured eccentrically upon a crank wheel or disk attached to a stud which projects through the top of the casing, the movement of said lever being limited by stop-pins. As will be understood by reference to said patent, the operator turns this lever to throw the pinion into gear with one of two racks on the feed-bar, or to hold said pinion between the racks and out of contact with the same, for the purposes therein set forth. The disadvantages arising from this construction are that the length of the button-hole is not uniform, and the number of barring-stitches is not the same on every button-hole, owing, of course, to the fact that it is practically impossible that the eye of the operator shall constitute a uniform and accurate gage. To overcome these difficulties I have provided means for operating said pinion automatically, constructed and arranged as follows:

A is a rack-bar arranged to slide freely within the casing B, and projecting upward outside the casing, as seen at C. The slide of this rack is guided by a pin, D, projecting upward from the casing through a slot, E, in the rack-bar.

F is a crank wheel or disk having secured thereto, through the medium of an eccentrical short shaft, G, a crank-arm, H, with an upwardly-projecting lug, I. The construction and function of this crank-arm are precisely the same as in the patent last referred to. The crank-wheel is provided with cogs on its periphery, which mesh with those in the rack-bar, and it will be readily understood that the meshing of these cogs will turn the crank-arm with the same results relative to those parts of the machine actuated by said crank-arm as are accomplished by the manipulation of the bent controlling-lever, provided the movements of the rack-bar and said lever are simultaneous and operate to turn the crank-arm to the same extent.

J is a frame secured to the upward projection C of the rack-bar, as seen at K, Figs. 1, 8, and 9, so as to slide freely with the same. The frame is steadied, so as to move in a constant horizontal and vertical plane, by a screw, L, passed through a slot, M, into the casing.

N is a bar attached to the casing by a screw, O, in such manner as to slide freely in a horizontal plane. The front end of this bar terminates in a lug, P, which is inserted in an eye, Q, on the clamp-slide, so that as the latter moves forward or backward it will carry the bar N with it.

R S are raised inclined projections on the upper part of said bar, the latter projection consisting of an independent piece of metal having a downwardly-projecting shank provided with a longitudinal slot. A set-screw, T, is passed through this slot into the said bar, and by manipulating this screw and sliding said projection the length of the button-hole may be varied, as will be presently explained.

U is a wiper-wheel (see Fig. 10) located within the frame J, and having washers V on both sides thereof to keep it in position.

W is a ratchet-wheel placed at the back of the rear inside washer, the wiper, both washers, and the ratchet-wheel being pivoted to the turret X by a common central screw, Y, in such manner that the turning of the ratchet-wheel will impart a like motion to said wiper and washers.

Z is a dog pivoted at the base of the turret, and having at one extremity a pivoted pawl, A', the other or heel end resting upon the upper surface of the sliding bar N.

B' is a coil-spring which serves to keep the dog up in its normal position, as shown at Fig. 5, so that the pawl A' may be in the proper position relative to the ratchet-wheel, as will be presently explained.

The ratchet is made up of two long teeth placed on opposite sides of the wheel, with intermediate shorter teeth, and the relations between the pawl and ratchet are such that the normal position of the former is as shown at Fig. 5, where the end of the pawl is just beyond one long tooth.

C' is a second pawl, secured to the cross-bar D', which is attached to the reciprocating driving-rods E' in the turret, and operating in a vertical plane therewith, and the relation between this pawl and the ratchet is such that the forward extremity of said pawl is in its normal position at the base of the incline of the long tooth opposite to that above mentioned, as seen at Fig. 5. The downward movement of the reciprocating rods is such that the pawl C' will only be carried throughout the length of the short teeth on the ratchet, the function of this pawl being to catch on the teeth at such downward movement, and turn the ratchet on the upward movement.

When the position of the several parts is as shown at Fig. 5, it will be readily understood that the movement of the pawl C' will not actuate the ratchet, because said pawl will travel only about half-way up the incline of the long tooth.

Figure 12:
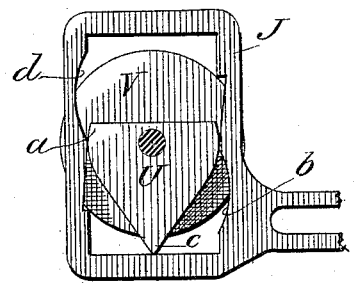
Figure 13:
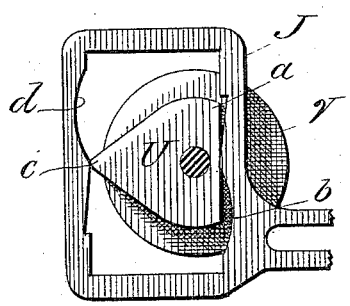

As hereinbefore set forth, the heel end of the dog Z rests upon the upper surface of the sliding bar N. As the latter is being carried along by the feed-bar, one of the inclined projections R S, as the case may be, strikes against the pivoted dog and raises the heel end, thereby lowering the other end, which causes the pawl A' to pull the ratchet W around sufficiently so that the normal position of the pawl C' will be changed to about half-way up the incline of the long tooth. At the downward movement of the latter pawl it will now pass beyond the long tooth and drop into the next space, and at the upward movement it will turn the ratchet around. The pawl will thus continue to operate on the short teeth and turn the ratchet-wheel until said pawl has fallen upon the incline of the other long tooth, when the spring B' will return the pawl A' to its normal position, and both pawls are in the same position relative to the ratchet as before described, and as illustrated at Fig. 5. As will be hereinafter set forth, the reverse movement of the sliding bar N will cause the other inclined projection to raise the dog Z and accomplish the same results. As hereinbefore stated, the revolving of the ratchet-wheel will impart a similar motion to the wiper-wheel U, and the cam $a$ will strike against the frame J (see Fig. 11) and force it forward, said frame being cut away or recessed, as seen at $b$, so that the cam $c$ will not be in contact therewith at that time. The frame being connected to the rack A, as above described, the movement of said frame by the wiper-wheel will cause the crank-wheel F to turn around and operate the same mechanism with the same result—namely, throwing the pinion out of gear with the feed-bar—as is shown and described in the patent to Baird, No. 206,768, above referred to. While the cam $a$ is operating on the frame, the distance between the pinion and the gear which it has left is constantly increasing until the said cam has finished its action, when the forward movement of the frame will cease and the pinion will be half-way between the two gears in the feed-bar. The movement of the wiper-wheel continues and the cam $c$ will travel along the bottom of the frame, as seen at Fig. 12, the latter of course being stationary at this time, and the machine is now performing the function of barring or "lock-stitching," as will be understood by reference to the above-mentioned patent. The cam c, during the continued movement of the wiper-wheel, strikes against the front part of the frame and forces it forward again until the relative position of the wiper and frame is as shown at Fig. 13, or directly opposite to that illustrated at Fig. 10. The pinion will now have been thrown into engagement with the rack on the other side of the feed-bar, and the movement of the latter will be reversed, and the operation of the machine will continue as above described.

In stitching a button-hole the operation of my improvement is as follows: The button-hole is stitched on one side during the forward movement of the feed-bar and while the wiper-wheel and frame are in the position illustrated at Fig. 10. While the wiper-wheel is being moved from the position shown at said figure until the cam $a$ ceases to operate on the frame, the pinion does not operate on the feed-bar; but at the same time the timing of the oscillating mechanism and the movement of said wiper-wheel are such that the barring or lock-stitching does not commence until the movement of the frame ceases, and continues while the cam c is traveling along the lower part of said frame, and stops when said cam strikes the forward portion of the frame. This cam now forces the frame forward again, and when the wiper-wheel and frame have assumed the position shown at Fig. 13 the pinion will have geared with the other side of the feed-bar, and the movement of the latter will now be reversed, and the button-hole will be stitched on the other side until the wiper-wheel again operates, when the barring at the finish will be effected and the button-hole thereby completed.

By the foregoing it will be readily understood that the movement of the feed-bar and the operation of the mechanism which controls the barring or lock-stitching are perfectly automatic, which of course insures a uniform, positive, and constant result. Should a longer or shorter button-hole be desired, this may be accomplished by shifting the projection S, as hereinbefore set forth, thereby increasing or decreasing the distance between it and the projection R, and the sliding plate would have to travel a greater or less distance, as the case might be, before the said projections could operate on the dog Z, which would accordingly increase or decrease the length of the button-hole.

I do not wish to be confined to the exact manner shown and described of communicating the movement from the frame to the crank-wheel, as the rack-bar and gear may be entirely done away with, and any suitable lever-connection made between said frame and the short shaft or crank-arm, the gist of my invention in this respect resting in the broad idea of effecting the required movement of the crank-wheel by the automatic motion of the frame, substantially as set forth.

Having thus described my invention, what I claim as new, and desire to secure by Letters Patent, is—

1. In combination with the racked feed-bar and pinion and means for vibrating said bar, the frame recessed as described, and actuated by the intermittently-revolving wiper-wheel, substantially as set forth.

2. The wiper-wheel arranged on the same shaft with the ratchet-wheel having two long teeth and intermediate shorter teeth, in combination with the frame, means for imparting an intermittent motion to said ratchet-wheel, and mechanism for effecting the barring and reversing the feed, substantially as described.

3. In a machine for stitching button-holes or other similar machines, the sliding bar having inclined projections and connected with the feed-bar, in combination with means for actuating the feed-bar, the wiper-wheel, and mechanism for operating the same, substantially as set forth.

4. The sliding bar having inclined projections and connected with the feed-bar, in combination with means for feeding said bar, the wiper-wheel, ratchet-wheel, and means for operating the same, the frame recessed as described, pinion, and mechanism for vibrating the feed-bar, substantially as shown and set forth.

5. The wiper-wheel secured within the frame, in combination with the ratchet-wheel secured on the same shaft with said wiper, pivoted dog with pawl attached thereto, sliding bar having inclined projections, means for operating the ratchet-wheel, and the feed-actuating mechanism, substantially as described.

6. The frame connected to mechanism for operating the racked feed-bar laterally, whereby the pinion may be thrown in and out of gear with said bar, in combination with the wiper-wheel, ratchet and pawls for operating the same, pivoted dog, sliding bar having inclined projections, and feed-actuating mechanism, substantially as and for the purposes set forth.

7. The ratchet-wheel having two long teeth and intermediate shorter teeth, in combination with means for imparting an intermittent rotary motion to the same, the wiper-wheel, frame, the feed-bar and means for vibrating the same, and the feed-actuating mechanism, substantially as set forth.

8. The ratchet-wheel W, having two long teeth and intermediate shorter teeth, in combination with the pivoted dog Z, carrying pawl A', pawl C', attached to the reciprocating cross-bar D', sliding bar N, attached to the feed-bar, and the feed-actuating mechanism, substantially as set forth.

9. The frame recessed as described, in combination with the wiper-wheel arranged interiorly therein, washers V, ratchet-wheel W and mechanism for operating the same, and the feed-actuating mechanism, substantially as set forth.

10. The sliding bar N, with inclined projections R S, the latter being adjustable, whereby the distance between said projections may be varied, in combination with the feed-bar and means for operating the feed, and the mechanism which operates to effect the barring and reverse the feed, substantially as described.

11. The frame J, recessed as described, and connected to the rack-bar A, in combination with the toothed crank-wheel F, racked feed-bar and means for vibrating the same, pinion and mechanism for actuating the same, wiper-wheel U, ratchet-wheel with two long teeth and intermediate shorter teeth, sliding bar N, having inclined projections R S, the latter adjustable as described, feeding mechanism, pivoted dog Z, carrying pawl A', and pawl C', attached to the reciprocating cross-bar D', substantially as described.

In testimony whereof I affix my signature in presence of two witnesses.

CARL J. A. SJOBERG.

Witnesses:
W. W. MORTIMER,
S. S. WILLIAMSON.